United States Patent
Boven et al.

(10) Patent No.: US 7,250,124 B2
(45) Date of Patent: Jul. 31, 2007

(54) STRUCTURAL REINFORCEMENT ARTICLE AND PROCESS FOR PREPARATION THEREOF

(75) Inventors: Michelle L. Boven, Clarkston, MI (US); Zhicheng Li, Troy, MI (US); Glenn G. Eagle, Bloomfield Hills, MI (US); Jason C. Brodil, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 533 days.

(21) Appl. No.: 10/794,909

(22) Filed: Mar. 5, 2004

(65) Prior Publication Data

US 2004/0213932 A1 Oct. 28, 2004

Related U.S. Application Data

(60) Provisional application No. 60/452,007, filed on Mar. 5, 2003.

(51) Int. Cl.
*B29C 41/02* (2006.01)
*B29C 45/16* (2006.01)

(52) U.S. Cl. ............... 264/46.4; 156/247; 264/54; 264/261

(58) Field of Classification Search ......... 264/261, 264/46.5, 46.4, 54; 156/247
See application file for complete search history.

(56) References Cited

U.S. PATENT DOCUMENTS

| | | | |
|---|---|---|---|
| 2,866,744 A | 12/1958 | Askey et al. | 208/65 |
| 3,581,681 A | 6/1971 | Newton | 108/51 |
| 3,755,212 A | 8/1973 | Dunlap et al. | 260/2.5 BD |

(Continued)

FOREIGN PATENT DOCUMENTS

DE 10163253 A1 12/2001

(Continued)

OTHER PUBLICATIONS

Derwent 2002-449608, JP 2002127938.

(Continued)

*Primary Examiner*—Allan R. Kuhns (57) ABSTRACT

The invention is a process for the preparation of article comprising placing a film on each inner surface of each part of a two part mold; placing an article in the mold with film located between the surface of the mold and the article such that there is a small space between the article and the surface of the mold; closing the mold about the article; injecting between the film and the article an expandable plastic material under conditions that the article is coated with the expandable material and the expandable material does not expand; removing the plastic article with the expandable material coated thereon with the two films attached to the expandable plastic material. In another embodiment the invention is an article comprising a shaped plastic article; an expandable material coated in the shaped plastic article; and a film covering the material coated shaped plastic article. In another embodiment the invention is a method of reinforcing a structural member which comprises inserting an article according to this invention into a cavity of the structural member and heating the structural member and the article to a temperature at which the expandable plastic material expands and the film or the expandable material bonds to the inner surface of the structural member so as to fix the location of the article in the structural member.

16 Claims, 3 Drawing Sheets

U.S. PATENT DOCUMENTS

| | | | |
|---|---|---|---|
| 3,821,130 A | 6/1974 | Barron et al. | 260/2.5 BD |
| 3,849,146 A | 11/1974 | Walters et al. | 96/107 |
| 3,859,162 A | 1/1975 | Johnson et al. | 428/318.6 |
| 4,017,117 A | 4/1977 | Eggert et al. | 296/146.6 |
| 4,019,301 A | 4/1977 | Fox | 52/725 |
| 4,390,645 A | 6/1983 | Hoffman et al. | 521/137 |
| 4,451,518 A | 5/1984 | Miura et al. | 296/146.6 |
| 4,572,856 A * | 2/1986 | Gembinski | 428/71 |
| 4,751,249 A | 6/1988 | Wycech | 521/54 |
| 4,769,391 A | 9/1988 | Wycech | 521/54 |
| 4,813,690 A | 3/1989 | Coburn, Jr. | 277/205 |
| 4,874,650 A | 10/1989 | Kitoh et al. | 428/68 |
| 4,898,630 A | 2/1990 | Kitoh et al. | 156/79 |
| 4,997,951 A | 3/1991 | Bagga | 548/352 |
| 5,076,632 A | 12/1991 | Surratt | 296/205 |
| 5,102,188 A | 4/1992 | Yamane | 296/203.03 |
| 5,213,391 A | 5/1993 | Takagi | 296/205 |
| 5,218,792 A | 6/1993 | Cooper | 296/203.03 |
| 5,266,133 A | 11/1993 | Hanley et al. | 156/71 |
| 5,344,208 A | 9/1994 | Bien et al. | 296/187 |
| 5,373,027 A | 12/1994 | Hanley et al. | 521/84.1 |
| 5,506,025 A | 4/1996 | Otto et al. | 428/98 |
| 5,533,781 A | 7/1996 | Williams | 296/204 |
| 5,545,361 A | 8/1996 | Rosasco | 264/45.2 |
| 5,609,385 A | 3/1997 | Daniel et al. | 296/203.01 |
| 5,648,401 A | 7/1997 | Czaplicki et al. | 521/85 |
| 5,660,428 A | 8/1997 | Catlin | 296/203.01 |
| 5,720,510 A | 2/1998 | Daniel et al. | 296/203.01 |
| 5,725,272 A | 3/1998 | Jones | 296/208 |
| 5,806,919 A | 9/1998 | Davies | 296/205 |
| 5,833,897 A | 11/1998 | Grimm | 264/46.5 |
| 5,857,734 A | 1/1999 | Okamura et al. | 296/187.12 |
| 5,866,052 A | 2/1999 | Muramatsu | 264/46.6 |
| 5,871,253 A | 2/1999 | Erber | 296/146.6 |
| 5,884,960 A | 3/1999 | Wycech | 296/146.6 |
| 5,888,600 A | 3/1999 | Wycech | 428/35.9 |
| 5,968,995 A | 10/1999 | Rizk et al. | 521/159 |
| 5,985,435 A | 11/1999 | Czaplicki et al. | 428/323 |
| 6,003,274 A | 12/1999 | Wycech | 52/232 |
| 6,040,350 A | 3/2000 | Fukui | 521/135 |
| 6,050,579 A | 4/2000 | Selland et al. | 296/204 |
| 6,058,673 A | 5/2000 | Wycech | 52/721.4 |
| 6,062,624 A | 5/2000 | Crabtree et al. | 296/39.3 |
| 6,068,424 A | 5/2000 | Wycech | 403/269 |
| 6,079,180 A | 6/2000 | Wycech | 296/203.01 |
| 6,092,862 A | 7/2000 | Kuwahara | 296/204 |
| 6,092,864 A | 7/2000 | Wycech et al. | 296/204 |
| 6,096,403 A | 8/2000 | Wycech | 428/122 |
| 6,099,948 A | 8/2000 | Paver | 428/304.4 |
| 6,131,897 A | 10/2000 | Barz et al. | 269/207 |
| 6,135,542 A | 10/2000 | Emmelmann et al. | 296/203.01 |
| 6,146,566 A | 11/2000 | Beeck et al. | 264/101 |
| 6,149,227 A | 11/2000 | Wycech | 296/188 |
| 6,150,428 A | 11/2000 | Hanley, IV et al. | 521/135 |
| 6,164,716 A | 12/2000 | Palazzolo et al. | 296/146.6 |
| 6,165,588 A | 12/2000 | Wycech | 428/122 |
| 6,168,226 B1 | 1/2001 | Wycech | 296/146.6 |
| 6,189,953 B1 | 2/2001 | Wycech | 296/188 |
| 6,196,619 B1 | 3/2001 | Townsend et al. | 296/146.6 |
| 6,199,940 B1 | 3/2001 | Hopton et al. | 296/187 |
| 6,218,442 B1 | 4/2001 | Hilborn et al. | 521/85 |
| 6,233,826 B1 | 5/2001 | Wycech | 29/897.1 |
| 6,237,304 B1 | 5/2001 | Wycech | 52/731.6 |
| 6,247,287 B1 | 6/2001 | Takabatake | 52/731.6 |
| 6,253,524 B1 | 7/2001 | Hopton et al. | 52/731.2 |
| 6,270,600 B1 | 8/2001 | Wycech | 156/79 |
| 6,272,809 B1 | 8/2001 | Wycech | 52/731.6 |
| 6,276,105 B1 | 8/2001 | Wycech | 52/309.8 |
| 6,281,260 B1 | 8/2001 | Hanley, IV et al. | 521/135 |
| 6,287,666 B1 | 9/2001 | Wycech | 428/122 |
| 6,296,298 B1 | 10/2001 | Barz | 296/187 |
| 6,305,136 B1 | 10/2001 | Hopton et al. | 52/309.7 |
| 6,311,452 B1 | 11/2001 | Barz et al. | 52/735.1 |
| 6,332,731 B1 | 12/2001 | Wycech | 403/171 |
| 6,346,573 B1 | 2/2002 | White | 525/121 |
| 6,348,513 B1 | 2/2002 | Hilborn et al. | 521/95 |
| 6,357,819 B1 | 3/2002 | Yoshino | 296/189 |
| 6,376,564 B1 | 4/2002 | Harrison | 521/54 |
| 6,378,933 B1 | 4/2002 | Schoen et al. | 296/203.02 |
| 6,387,470 B1 | 5/2002 | Chang et al. | 428/121 |
| 6,406,078 B1 | 6/2002 | Wycech | 293/120 |
| 6,413,611 B1 | 7/2002 | Roberts et al. | 428/99 |
| 6,419,305 B1 | 7/2002 | Larsen | 296/203.03 |
| 6,422,575 B1 | 7/2002 | Czaplicki et al. | 277/628 |
| 6,423,755 B1 | 7/2002 | Allen et al. | 521/111 |
| 6,451,231 B1 | 9/2002 | Harrison et al. | 264/45.3 |
| 6,455,126 B1 | 9/2002 | Wycech | 428/122 |
| 6,455,144 B1 | 9/2002 | Wycech | 428/308.4 |
| 6,467,834 B1 | 10/2002 | Barz et al. | 296/187 |
| 6,471,285 B1 | 10/2002 | Czaplicki et al. | 296/188 |
| 6,474,722 B2 | 11/2002 | Barz | 296/187 |
| 6,474,723 B2 | 11/2002 | Czaplicki et al. | 296/188 |
| 6,475,577 B1 | 11/2002 | Hopton et al. | 428/34.7 |
| 6,478,367 B2 | 11/2002 | Ishikawa | 296/203.03 |
| 6,482,486 B1 | 11/2002 | Czaplicki et al. | 428/36.91 |
| 6,494,525 B1 | 12/2002 | Blank | 296/187 |
| 6,502,821 B2 | 1/2003 | Schneider | 276/146.6 |
| 6,503,426 B1 * | 1/2003 | Horwitz | 264/46.5 |
| 6,519,854 B2 | 2/2003 | Blank | 29/897.1 |
| 6,546,693 B2 | 4/2003 | Wycech | 52/790.1 |
| 6,550,847 B2 | 4/2003 | Honda et al. | 296/146.6 |
| 6,561,571 B1 | 5/2003 | Brennecke | 296/187 |
| 6,573,309 B1 | 6/2003 | Reitenbach et al. | 521/135 |
| 6,575,309 B1 | 6/2003 | Chiga | 210/435 |
| 6,607,238 B2 | 8/2003 | Barz | 296/187 |
| 6,619,727 B1 | 9/2003 | Barz et al. | 296/203.02 |
| 6,630,221 B1 | 10/2003 | Wong | 428/117 |
| 6,649,243 B2 | 11/2003 | Robert et al. | 428/99 |
| 6,668,457 B1 | 12/2003 | Czaplicki | 29/897.1 |
| 6,739,641 B2 | 5/2004 | McLeod et al. | 296/37.2 |
| 2002/0033617 A1 | 3/2002 | Blank | 296/187 |
| 2002/0036338 A1 | 3/2002 | Matsuo et al. | 257/686 |
| 2002/0053179 A1 | 5/2002 | Wycech | 52/721.4 |
| 2002/0074083 A1 | 6/2002 | Ludin et al. | 156/293 |
| 2002/0074827 A1 | 6/2002 | Fitzgerald et al. | 296/188 |
| 2002/0094427 A1 | 7/2002 | Edwards et al. | 428/297.4 |
| 2002/0096833 A1 | 7/2002 | Czaplicki et al. | 277/316 |
| 2002/0115736 A1 | 8/2002 | Koshy | 521/99 |
| 2002/0125739 A1 | 9/2002 | Czaplicki et al. | 296/187 |
| 2002/0148198 A1 | 10/2002 | Wycech | 52/790.1 |
| 2002/0164450 A1 | 11/2002 | Lupini et al. | 428/99 |
| 2002/0174954 A1 | 11/2002 | Busseuil et al. | 156/349 |
| 2002/0178584 A1 | 12/2002 | Wycech | 29/897.2 |
| 2002/0192387 A1 | 12/2002 | Agarwal et al. | 427/407.1 |
| 2003/0001410 A1 | 1/2003 | Cate et al. | 296/187 |
| 2003/0001469 A1 | 1/2003 | Hankins et al. | 312/257.1 |
| 2003/0018095 A1 | 1/2003 | Agarwal | 521/59 |
| 2003/0099826 A1 | 5/2003 | Juras et al. | 428/343 |
| 2003/0102686 A1 | 6/2003 | McLeod et al. | 296/37.2 |
| 2003/0102687 A1 | 6/2003 | McLeod et al. | 296/37.2 |
| 2003/0127844 A1 | 7/2003 | Gloceri et al. | 280/788 |
| 2003/0137162 A1 | 7/2003 | Kropfeld | 296/203.01 |
| 2003/0184121 A1 | 10/2003 | Czaplicki et al. | 296/187.02 |
| 2003/0209921 A1 | 11/2003 | Coon et al. | 296/187.02 |
| 2004/0131839 A1 | 7/2004 | Eagle | 428/317.1 |

FOREIGN PATENT DOCUMENTS

| | | |
|---|---|---|
| EP | 0 827 473 B1 | 11/1996 |
| EP | 0 897 439 B1 | 11/1997 |
| EP | 0 899 300 A2 | 8/1998 |
| EP | 1 020 273 A1 | 7/2000 |
| EP | 1 364 862 A2 | 4/2003 |
| WO | 99/08854 | 2/1999 |

| WO | 00/13876 | | 3/2000 |
| WO | 00/27920 | | 5/2000 |
| WO | 00/55444 | | 9/2000 |
| WO | 01/34453 | A1 | 5/2001 |
| WO | 01/41950 | A2 | 6/2001 |
| WO | 01/41950 | A3 | 6/2001 |
| WO | 01/54936 | A1 | 8/2001 |
| WO | 01/56845 | A1 | 8/2001 |
| WO | 01/68342 | A1 | 9/2001 |
| WO | 01/41950 | A2 | 12/2001 |
| WO | 02/12026 | A1 | 2/2002 |
| WO | 02/24451 | A1 | 3/2002 |
| WO | 02/26549 | A1 | 4/2002 |
| WO | 02/26550 | A1 | 4/2002 |
| WO | 02/31077 | A2 | 4/2002 |
| WO | 02/31077 | A3 | 4/2002 |
| WO | 02/36338 | A1 | 5/2002 |
| WO | 02/49836 | A1 | 6/2002 |
| WO | 02/074608 | A1 | 9/2002 |
| WO | 02/074609 | A1 | 9/2002 |
| WO | 02/087843 | A1 | 11/2002 |
| WO | 02/088214 | | 11/2002 |

OTHER PUBLICATIONS

Derwent 2003-124835, JP2002362412.
Derwent 2000-340652, EP 999119A2.
Patent Abstracts of Japan, JP 59077973.

* cited by examiner

STRUCTURAL REINFORCEMENT ARTICLE AND PROCESS FOR PREPARATION THEREOF

CROSS REFERENCE TO RELATED APPLICATION

This application claims the benefit of U.S. Provisional Application No.60/452,007, filed Mar. 5, 2003.

FIELD OF INVENTION

This invention relates to an article coated with an expandable composition, such as a structural reinforcement article which is adapted to reinforce a structural member, such as a structural member of an automobile, a house or any construction which includes structural members designed to give structural integrity to the construction. In another embodiment the invention is a process for preparing an article coated with an expandable composition. In yet another embodiment the invention is a method of reinforcing a structural member using the structural reinforcement articles of the invention.

BACKGROUND OF INVENTION

The automotive industry is under regulatory pressure to reduce average fuel consumption and improve the crashworthiness of vehicles. To improve fuel consumption lighter and thinner materials are being used. Unfortunately, this reduces the structural integrity of parts of an automobile. To compensate automobile producers place structural reinforcing members into hollow structural members, such as A and B pillars of automobiles. Structural reinforcing members and their use in automobiles are described in Thum U.S. Pat. No. 5,194,199; Keller U.S. Pat. No. 6,146,565; Wycech U.S. Pat. No. 6,165,588; Hopton et al. U.S. Pat. No. 6,199,940; Barz U.S. Pat. No. 6,131,897 and Sheldon et. al, U.S. patent application 2002/0160130, all incorporated herein by reference. These structural reinforcing articles generally comprise some structural part, which gives the reinforcing articles shape and strength, which structural part is based on a light weight metal or a rigid plastic. The structural part is coated with an expandable composition, which expands when heated to a certain temperature. Typically the expandable composition expands to contact the inner walls of the structural member being supported. Upon expansion, the expandable composition functions to hold the structural reinforcing member in place permanently by adhering to the inner wall of the structural member or by friction because the expanded composition is wedged tightly in position. The expanded composition also helps transfer a load from sheet metal to inner reinforcement to sheet metal.

The expandable composition is applied to the structural part of the structural reinforcing member by conventional means known in the art, such as hand applied sheets of epoxy, compression molding, resin transfer molding and injection molding. Some of the expandable materials exhibit adhesive properties at elevated temperatures. This is desirable for affixing the expandable composition to the structural part of the structural reinforcing member. The adhesive properties can cause problems in manufacturing of the structural reinforcing member because it can be difficult to remove the structural reinforcing member with the expandable materials deposited thereon from the mold. In order to pump the expandable material and apply it, it is necessary to heat the expandable material and the mold to facilitate application. Thereafter to prevent, or reduce adhesion to the mold, the mold is cooled prior to opening the mold. Even when cooled some of the expandable materials will still adhere to the mold, forcing an operator to manually remove some of the expandable material. Heating the mold to application temperature and then cooling before attempting to remove the coated structural reinforcing member results in long processes, up to an hour per part per mold. In high volume parts manufacture this results in the need for large amount of capital to keep up with the demand for the part. In addition to the long cycle times there are post process steps that may need to take place to make a tack free part including but not limited to dusting of the surface of the expandable material with a material which renders the surface tack free such as glass balloons.

What is needed is a part that can be manufactured in an efficient manner with low part residence times in molds and little or no post molding processing steps. What is also needed is a process, which can produce expandable material coated articles, such as structural reinforcing members, in a cost efficient manner maximizing the productivity of tools used to manufacture the parts.

SUMMARY OF INVENTION

The invention is a process for the preparation of article comprising placing a film on the top inner and bottom inner half of a insert molding tool; placing an article in the mold with film located between the surface of the mold and the article; closing the mold about the article such that there is a small space between the article and the surface of the mold; injecting between the film and the article an expandable material under conditions that the article is coated with the expandable material and the expandable material does not expand; removing the plastic article with the expandable material coated thereon with the film attached to the expandable material. Preferably, when the article is placed in the mold, there is a small space between the article and the surface of the mold; with the space between the article and the mold created from crush stand offs on the article and or the over molding tool.

In another embodiment the invention is an article comprising a shaped article; an expandable material coated in the shaped article; and a film covering the expandable material coated shaped article.

In another embodiment the invention is a method of reinforcing a structural member which comprises inserting an article according to this invention into a cavity of the structural member and heating the structural member and the article to a temperature at which the expandable material expands and the film or the expandable material bonds to the inner surface of the structural member so as to permanently fix the article in the structural member.

The process of the invention allows the preparation of an article coated with an expandable material in an efficient manner allowing tools to cycle with a hold time of about 5 minutes or less, and more preferably as low as about 60 to about 90 seconds per part.

In another embodiment the invention is a method of molding with a film in which the melting point of the film is lower than the temperature of the molding tool during molding operations. The film with the low melting point is placed on top of another film with a melting point above the molding temperature of the tool during molding operations. The film with the high melting point is referred to as the carrier film. The film with the low melting point is referred to as the leave-on film. This two film combination is placed on the top half and bottom half of the tool. The carrier film and leave-on film are placed into the tool together with the carrier film closest to the tool and the leave-on film closest to the open cavity portion of the tool. The two film combination can be placed into the tool as one piece, with the two film combination folded over with the insert in the middle of the film or the two film combination can be placed in the tool as two separate film pieces. The carrier film allows the use of a leave-on film with a melting temperature lower then the temperature needed to process the expandable material. Preferably, the carrier film and the leave-on film are separated after removal from the mold. The removed carrier film can thereafter be discarded.

DETAILED DESCRIPTION OF THE INVENTION

This invention relates to a process for efficiently applying an expandable material to a shaped article in an efficient manner and to the article so prepared. Shaped article as used herein means any article which is formed into a shape near its' final use shape. Generally, the article can be fabricated from any known material, such as plastic, metal, ceramic, glass and the like. In applications where weight is a key factor, such as where the shaped article is used in an automobile, lighter materials such as plastics are preferably used. The plastic material may be nylon, styrenic, polyolefin, such as polyethylene or polypropylene, polycarbonate, polyester, polyurethane, polyepoxide, poyurea, polyphenylene sulfide, polyetherimide, toughened plastics such as ABS (acrylonitrile-butadiene-styrene) or previously mentioned materials containing elastomers such as styrene-alkadiene block copolymers, ethylene-octene copolymers and the like, and blends thereof, such as a polycarbonate-ABS blends. The rigid plastic shaped articles can be solid or hollow with hollow shaped articles preferred for applications where weight is a critical factor. In another embodiment the shaped article is foam. Foamed articles are preferably solid and provide lower density and higher strength. Preferably the shaped foamed articles are prepared from foam which can withstand the time and temperatures to which the expandable material must be exposed to expand. Preferably, the foam is based on polystyrene, polyurethane, polyurea or epoxy resins; more preferably on polyurethanes, polyureas, epoxy resins and most preferably polyurethanes. In a preferred embodiment the foam used is a foam described in the Allen, U.S. Pat. No. 6,423,755B1, incorporated herein by reference.

The shaped article can be used in any application where it is necessary to hold the article into place permanently in another structure. Such applications include in transportation vehicles, such at automobiles, light trucks, heavy-duty trucks and busses, rail cars, aircraft; buildings, appliances and heavy machinery. Preferably, the articles of the invention are used to reinforce structural members. A structural member is a part of a structure, as described above, which supports or protects the structure. In this embodiment, the articles of the invention are structural reinforcing members, which means that they are used to structurally strengthen the structure and integrity of the structural member into which they are inserted. Generally, the structural reinforcing members are inserted into hollow cavities of the structural member to improve the structural integrity of the structural member. Preferably the structural reinforcing members are used in buildings or vehicles, preferably vehicles, such as automobiles and light trucks. The articles of the invention may further comprise a means of locating and holding the article into a cavity until exposed to conditions such that the expandable material expands to hold the article in place. The means of locating and holding the article in place can be means which function to locate and/or hold the article in place prior to expansion of the expandable material. Such means include shaped standoffs or projections, tabs affixed to the part by mechanical affixing means (screws, nails, clips and the like), pressure sensitive adhesives, magnets and the like.

The expandable material useful in the invention can be any material which expands under controlled conditions and which does not expand under conditions of application to the part as described herein. In a preferred embodiment the expandable material exhibits adhesive properties under controlled conditions. It is also preferred that the expandable material is dry and not tacky to the touch at ambient conditions to facilitate shipping and handling. In the preferred embodiment, the expandable material is a polymeric material, and more preferably an expandable adhesive. A typical expandable adhesive includes a polymeric base material, such as an epoxy resin or ethylene-based polymer which, when compounded with appropriate ingredients (typically a blowing and curing agents), expands and cures in a reliable and predictable manner upon the application of heat. The expandable adhesive will also crosslink upon curing rendering the material incapable of further flow or shape change. Any material that is heat-activated and expands and cures in a predictable and reliable manner under appropriate conditions, while meeting structural requirements, for the selected application can be used. Other useful materials include polyolefins, copolymers and terpolymers with at least one monomer type an alplha-olefin, phenol/formaldehyde materials, phenoxy materials, and polyurethane materials with high glass transition temperature such as disclosed in U.S. Pat. No. 5,766,719; U.S. Pat. No. 5,755,486, U.S. Pat. No. 5,575526; U.S. Pat. No. 5,932,680, all inc by reference.

In a preferred embodiment, the expandable adhesive is a material comprising a) a 1-part epoxy resin; b) a viscosity increasing agent; and c) not greater than 25 parts by weight of an inorganic filler, based on 100 parts of the epoxy resin. The expandable material that is used to coat the article is prepared as a 1-part epoxy resin formulation. Preferred epoxy resins include diglycidyl ethers of bisphenol A and bisphenol F, as well as oligomers of diglycidyl ethers of bisphenol A and bisphenol F, either alone or in combination. More preferably, the epoxy resin is a mixture of diglycidyl ether of bisphenol A and an oligomer of diglycidyl ether of bisphenol A. The epoxy resin preferably constitutes from about 40 weight percent to about 80 weight percent of the total materials used to make the expandable adhesive. The viscosity increasing agent is a material that increases the viscosity of the blend used to make the expandable adhesive. The viscosity increasing agent is preferably used as a fine powder (volume mean average <200 μm) and preferably has a Tg, of at least about 70° C., more preferably at least about 100° C. Examples of preferred polymeric viscosity increasing agents include polymeric acrylates and methacrylates, more preferably polymethylmethacrylate (PMMA), most preferably a carboxylic acid functionalized PMMA, such as the commercially available Degalan™ 4944F PMMA (available from Rohm America). The polymeric viscosity increasing agent is used in an effective amount to control release of gas from the blowing agent so as to reduce cell size in the resultant cured resin. The concentration of the polymeric viscosity increasing agent is preferably at least 2, more preferably at least 5, and most preferably at least 10 weight percent; and preferably not more than 40 weight percent, more preferably not more than 30 weight percent, and most preferably not more than 20 weight percent, based on the total materials used to make the expandable adhesive. The polymerization of the epoxy resin is catalyzed by an effective amount of a polymerizing promoting catalyst, preferably from about 0.1 weight percent to about 2 weight percent, based on the total materials used to make the expandable adhesive. Preferable catalysts include, but are not restricted to amides, blocked amines, ureas and imidazoles. An example of a preferred catalyst is Acclerine CEL 2191 (1-(2-(2-hydroxbenzamido)ethyl)-2-(2-hydroxyphenyl-2-imidazoline, which has the following chemical structure:

The preparation of this catalyst is described by Bagga in U.S. Pat. No. 4,997,951, which description is incorporated herein by reference.

The epoxy resin is expanded to a desired volume in the presence of an effective amount of a blowing agent, preferably from about 0.5 weight percent to about 10 weight percent, based on the total materials used to make the expandable adhesive. Preferred blowing agents are heat activatable at a temperature of about 100° C. or greater, more preferably at about 120° C. or greater; and even more preferably about 150° C. or greater, and most preferably about 160° C. or greater and preferably not greater than about 200° C. Examples of suitable blowing agents include those described by Fukui in U.S. Pat. No. 6,040,350, column 4, lines 25-30, which section is incorporated herein by reference. An example of a preferred commercially available blowing agent is Celogen AZ™ 120 azodicarbonamide (from Crompton). The epoxy resin is cured using an effective amount of a curing agent, preferably from about 2 to about 10 weight percent, based on the total materials used to make the expandable adhesive. Examples of suitable curing agents include those described by Fukui in column 4, line 66-67 and column 5, lines 1-9, which sections are incorporated herein by reference. The expandable adhesive may also include organic filler such as a polyethylene copolymer or an inorganic filler such as calcium carbonate. The amount of inorganic filler is preferably not greater than about 25 parts by weight, more preferably not greater than about 15 parts by weight, and most preferably not greater than about 10 parts by weight, relative to 100 parts by weight of the expandable adhesive.

A preferred expandable adhesive is prepared by combining and mixing the epoxy resin, the blowing agent, the catalyst, the curing agent, the viscosity increasing agent, and optionally the inorganic and organic fillers at a temperature above ambient temperature, preferably from about 30° C. to about 50° C. for about 15 minutes to about 2 hours. Entrapped air is removed in vacuo.

The preferred cured (expanded) adhesive has a Young's modulus of at least about 500 MPa, more preferably at least about 700 MPa, and most preferably of at least about 1000 MPa at 100 percent expansion. Furthermore, the preferred cured adhesive has surprisingly small voids, preferably with a number weighted mean diameter of less than about 1000 µm, more preferably less than about 500 µm, and most preferably less than about 100 µm. Consequently, the adhesion of the SFI (structural foam insert) to the automotive structure is strong and durable.

The expandable material must also be capable of being pumped at temperature below the temperature at which the expandable material expands. This is to facilitate injection of the expandable material into the mold.

Alternatively the expandable material can be a material without adhesive properties. This is enabled when the film functions to bond the expandable material coated structural reinforcement member to the structural member. Any polymeric material, which can be expanded under controlled conditions and can be applied to the structural reinforcement member, can be used in this embodiment, examples include polyvinyl chloride (PVC), Poly Methyl Methacrylate (PMMA), phenoxy thermoplastics which further contain blowing agents.

The film used in this invention can be any film, which can retain its structural integrity when exposed to the conditions of applying the expandable material to the plastic article, and will not adhere to the mold surface under such conditions. There are two general types of films used. In one embodiment, the film does not have any adhesive character and is simply used to allow easy removal of the part from the mold. In another embodiment, the film has adhesive character under conditions where the expandable material expands. In this embodiment the expandable material does not require adhesive character.

In the embodiment wherein the film does not require adhesive character, the film is preferably a low surface energy film, preferably a polyolefin, such as high density polyethylene, low density polyethylene, fluorinated polyethylene or polypropylene. Alternatively, the film can be a high surface energy film coated with a low surface energy coating, for instance polyester coated with a low surface energy coating. In the embodiment where the film provides adhesion to the structural member, any film, which provides adhesion at the temperature of expansion of the expandable material, can be used. In one embodiment the film can be a corona treated polyolefin. In another embodiment the film can be a multilayer film with a layer on the outside which demonstrates adhesive character under conditions of expansion of the expandable material. The adhesive layer could be ethylene vinyl acetate or an ethylene acrylic acid co-polymer layer. Alternatively the film can function as a hot melt adhesive under conditions of expansion. Where the film functions as a hot melt adhesive it is desirable that the expandable material have adhesive properties also.

In another embodiment the film can be sprayed or coated on the mold prior to placing the article into the mold. Water based high molecular weight epoxy resins are useful in this embodiment, for example EPT-REZ™ 3540 water based epoxy. The water-based epoxy is contacted with the mold and the water is flashed off such that a film is formed on the mold. Thereafter the article is placed in the mold.

Molds used to prepare the articles of the invention are generally insert molds wherein an article is placed into the cavity of the tool. With the mold closed an outer shell cavity is created which is close to the size of the article being coated. The molds have at least one injection port to inject the expandable material into the mold. The molds need to have the capability to heat the expandable material and the article to facilitate application of the expandable material to the article. Generally the molds need to have the capability to be heated to a temperature high enough that the expandable material can be processed or flows and below the temperature at which the expandable material expands, such temperatures are about 90° C. or greater, and preferably about 150° C. or less and more preferably about 130° C. or less.

In the process of the invention, the film is applied to the mold as described; the article is placed in the mold with the film between the mold and the article. The expandable adhesive is then injected into the hot mold (about 90° C. to about 150° C., preferably to about 150° C.) that surrounds and conforms to the shape of the article to achieve thickness of adhesive over article ranging from about 1 mm to about 4 mm, the thickness can vary across the surface of the articles. The article is left in the mold for sufficient time to achieve a coating of the desired thickness on the article. If the expandable material is thermoplastic in nature this is sufficient. If the coating is a liquid thermoset material, such as a paste epoxy, the material may need to be heated for an additional period of time to gel the expandable material to achieve the desired integrity of the coating. Generally the residence time of the article in the mold is about 6 minutes or less, preferably 3 minutes or less, and most preferably 90 seconds or less.

After the article is removed from the mold, the article is cooled. Generally, the mold can immediately be cycled, that is another of the described process can be started.

There are two types of film that would require defilming. The first is a film that would be removed and under that would be the expandable material. The second would be the multi-layer film using the carrier and leave-on film. Both types of film can be defilmed or removed after cooling to or below ambient or it can be left on the article until just before inserting it in the cavity of the structural member. For the first film, it is advantageous to leave the film on until just before insertion into the cavity of the structural member to facilitate handling and exposure of operators to uncured expandable material. If the film has adhesive properties, such as the leave-on film, it can be left on the article when it is inserted in the cavity of the structural member. In the embodiment where the film is entirely removed after molding, it is desirable to coat the part with a coating which renders the surface of the part non-tacky. The coating is generally a particulate material of a relatively small size. Any coating which renders the surface non-tacky may be used. Preferable coating materials include calcium carbide, glass balloons and the like.

In one embodiment, two films may be used. One film is an adhesive film (leave-on film) and the second is a carrier film which does not have adhesive properties. In one embodiment, the carrier film does not adhere to the adhesive (or leave-on) film. The films typically are arranged in the mold with the carrier film located adjacent to the mold and the adhesive film located adjacent to the part. Preferably, the carrier film has a relatively high melting temperature of 130° C. or greater, and preferably 160° C. or greater. The carrier film can be prepared from any material which can maintain its integrity under molding conditions. Further, it is preferable that the carrier film not adhere in a significant way to the mold under molding conditions. Preferably, the carrier film is prepared from a relatively non-polar polymeric material. Preferred polymeric materials are polyolefins or blends containing a volumetric majority of a polyolefin. Preferred polyolefins are polypropylene and polyethylene. A preferred polyethylene is low density polyethylene. Alternatively, the film could be a fluorinated polyethylene or silicon coated polyester. Most preferably, the carrier layer is a homopolymer polypropylene. The thickness of the carrier film is chosen to allow the carrier film to maintain its integrity during molding. Maintain its integrity means the film continues to stay in film form and can be handled in film form. Preferably, the carrier layer has a thickness of about 2 mils 0.0051 (mm) or greater and more preferably 2.5 mils (0.0645 mm) or greater. Preferably, the carrier layer has a thickness of 8 mil (0.20 mm) or less, more preferably about 6 mil (0.15 mm) or less and most preferably about 3 mil (0.076 mm) or less.

The second film is an adhesive or leave-on film. The leave-on film functions to protect the surface of the part during handling and transport. It also prevents contact of anyone who handles the part with the adhesive coated on the part. The leave-on film may also serve the function of an adhesive which aids in bonding the part in place in the structural member which is reinforced. Alternatively, the leave-on film melts under automobile paint oven conditions allowing the adhesive coated on the part to read through the film to bond to the inside surface of the structural member reinforced. Preferably, the leave-on film is tacky at elevated temperatures, but not tacky at ambient temperatures, about 15 to about 35° C. Preferably, the film is tacky or melts at the temperatures of an automotive paint oven. The leave-on layer may also be corona treated to improve bonding to the adhesive on the part during molding. The leave-on film can be prepared from any polymeric material which provides the properties discussed hereinbefore. Preferably, the leave-on film comprises a polymer which contains polar functional groups, such as carboxylic acid, acetate, hydroxyl and the like. In another embodiment, the leave-on film comprises a blend of a polymer with functional groups and a non-polar polymer for instance a polyolefin, copolyester or copolyamide, a polyolefin. Preferred polar group containing polymers include ethylene vinyl acetates, ethylene ethyl acrylates, maleic anhydride grafted polyolefins, alkylene acrylic acids (such as ethylene acrylic acid) blends thereof and the like. The leave-on film is preferably thick enough to render the surface of the part non-tacky under ambient conditions. Preferably, the thickness of the leave-on film is 0.1 mils (0.003 mm) or greater and most preferably about 0.4 mil (0.01016 mm or greater). Preferably, the leave-on film is about 4 mils (0.1 mm) or less, more preferably about 2 mils (0.0051 mm) or less and most preferably about 0.8 mils (0.020 mm) or less.

In one embodiment, the two films can be formed as a single two-layer film and used as such in the preparation of the part. In this embodiment, the carrier portion of the film must be removable from the part after fabrication and the leave-on film is left behind. In this embodiment, the two layer film is placed in the mold, the mold is closed, and the adhesive is injected between the part and film. After the part is removed from the mold, the carrier film is removed and the leave-on film is left behind.

In another embodiment, the film can comprise three layers; the carrier film, the leave-on film and an adhesion layer located between the two layers which function to adhere the two layers together. The adhesion properties of the intermediate layer are preferably sufficient to hold the layers together during processing, but not so strong as to prevent the carrier film from being removed. Preferably, the intermediate film has a relatively strong adhesive bond with the carrier film and a relatively weak adhesive formed with the leave-on film so as to allow removal of the intermediate film with the carrier layer. The intermediate film can be prepared from any polymer which forms an adhesive bond with both the carrier and leave-on films and which allows the carrier film to be removed. Preferably, the intermediate layer is prepared from a non-polar polymer. Preferred polymers used are polyolefins, with homopolymer polypropylenes preferred. The intermediate film has sufficient thickness to hold the two other layers together during handling. Preferably, the intermediate layer has a thickness of about 0.2 mils (0.0051 mm) or greater. Preferably, the intermediate layer has a thickness of about 1 mil (0.025 mm) or less thick and more preferably about 0.4 mil (0.010 mm) thickness or less.

The films can be fabricated by well-known techniques such as multilayer coextrusions, casting or blown film processes.

The resultant article is affixed within a cavity of a structural member so as to create a gap between the article and the structural member of about 1-mm to about 4-mm. The structure is then exposed to conditions at which the expandable material cures, preferably to temperatures of about 140° C. or greater, more preferably 150° C. or greater, most preferably about 160° C. or greater, and preferably less than 205° C. and more preferably less than 200° C., preferably for a time of about 15 minutes or more and preferably about 25 minutes or more. In the embodiment where the structure is an automobile the expandable material is expanded during the e-coat process, with residual e-coat liquid escaping through the gaps between article and the structural member. Finally, the e-coat and expandable adhesive are cured at a suitable curing temperature, preferably between about 150° C. and about 200° C.

Figure 1:
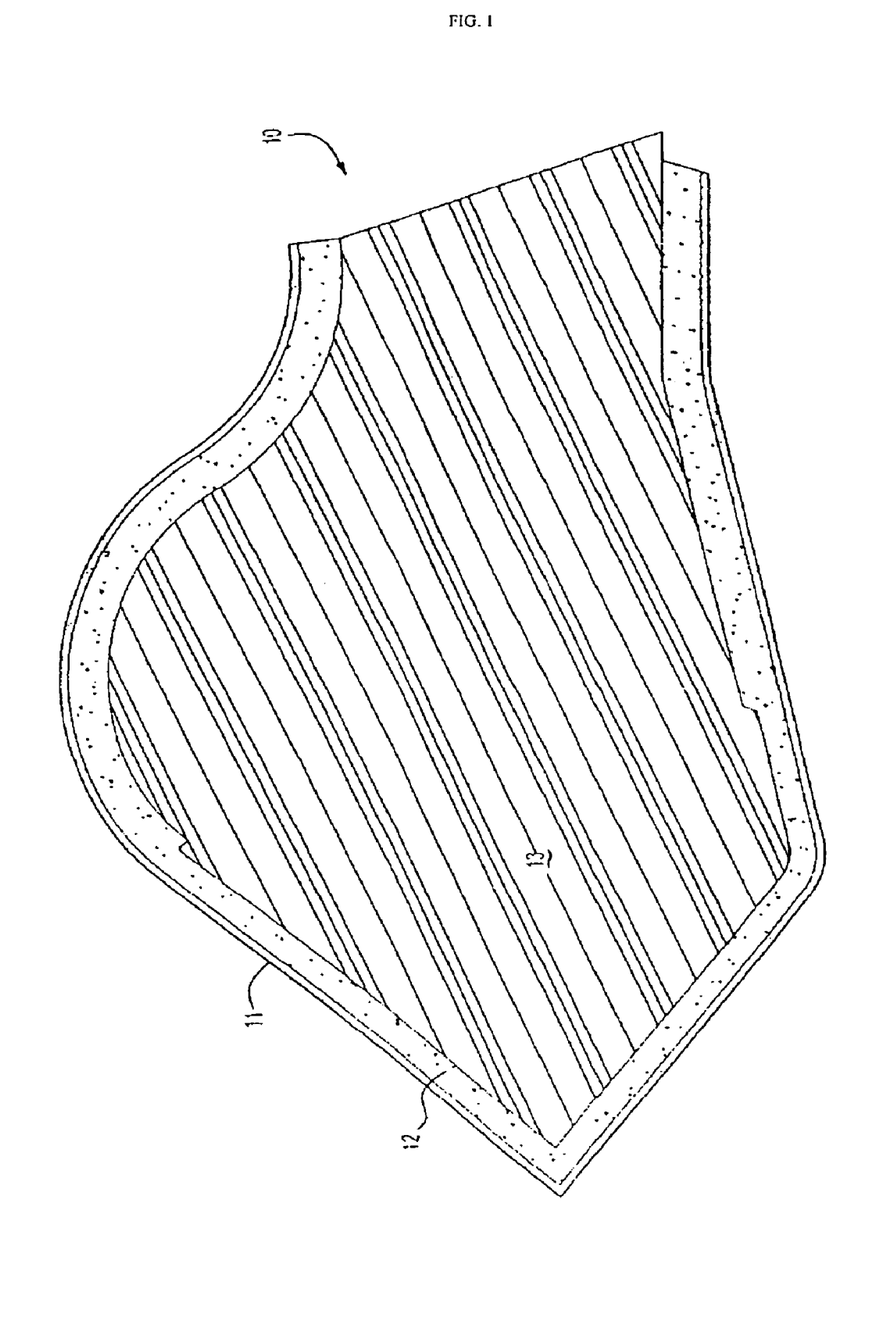
FIG. 1 shows a cross-sectional view of a structural reinforcing member.

FIG. 1 shows a cross-sectional view of a portion of structural reinforcing member, (10). The structural reinforcing member has a film (11) adhered to an expandable material layer (12) coated onto a shaped rigid foam structure (13).

Figure 2:
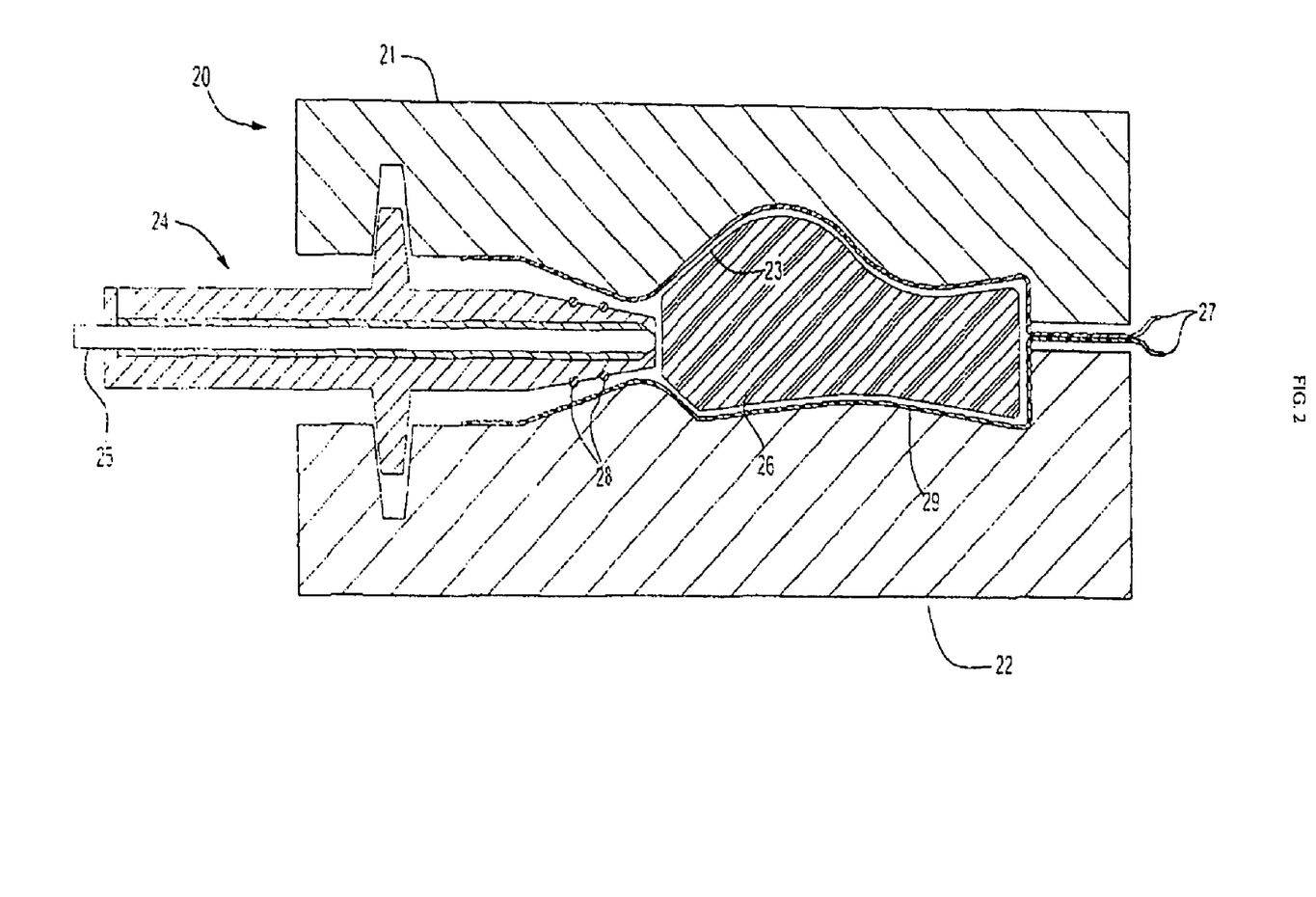
FIG. 2 illustrates an apparatus used to perform the process of the invention.

FIG. 2 illustrates a partially closed apparatus (20) for performing the process of the invention. The apparatus (20) comprises two halves of a mold (21 and 22) which when closed forms a cavity (23). The apparatus further comprises an injection nozzle (24) having a central tube (25) adapted for injecting expandable material into the mold cavity (23). About a part (26) located in the mold cavity (23) are two film portions (27) located between the part (26) and the halves of the mold (21 and 22). To seal between the injection nozzle (24) and the film portions (27), several methods can be used, such as 0 rings (28) as illustrated here or soft deformable seals, the film (27) itself squeezed between the mold (21 and 22) and the injection nozzle (24). There are 0 rings (28) located about the injection nozzle (24). The 0 rings (28) seal the film (27) so that any injected material stays between the film portions (27) and part (26). Located between the part (26) and the walls of the mold halves (21 and 22) layered with the film (27) is a gap (29) which is large enough to accommodate a coating of expandable material.

Figure 3:
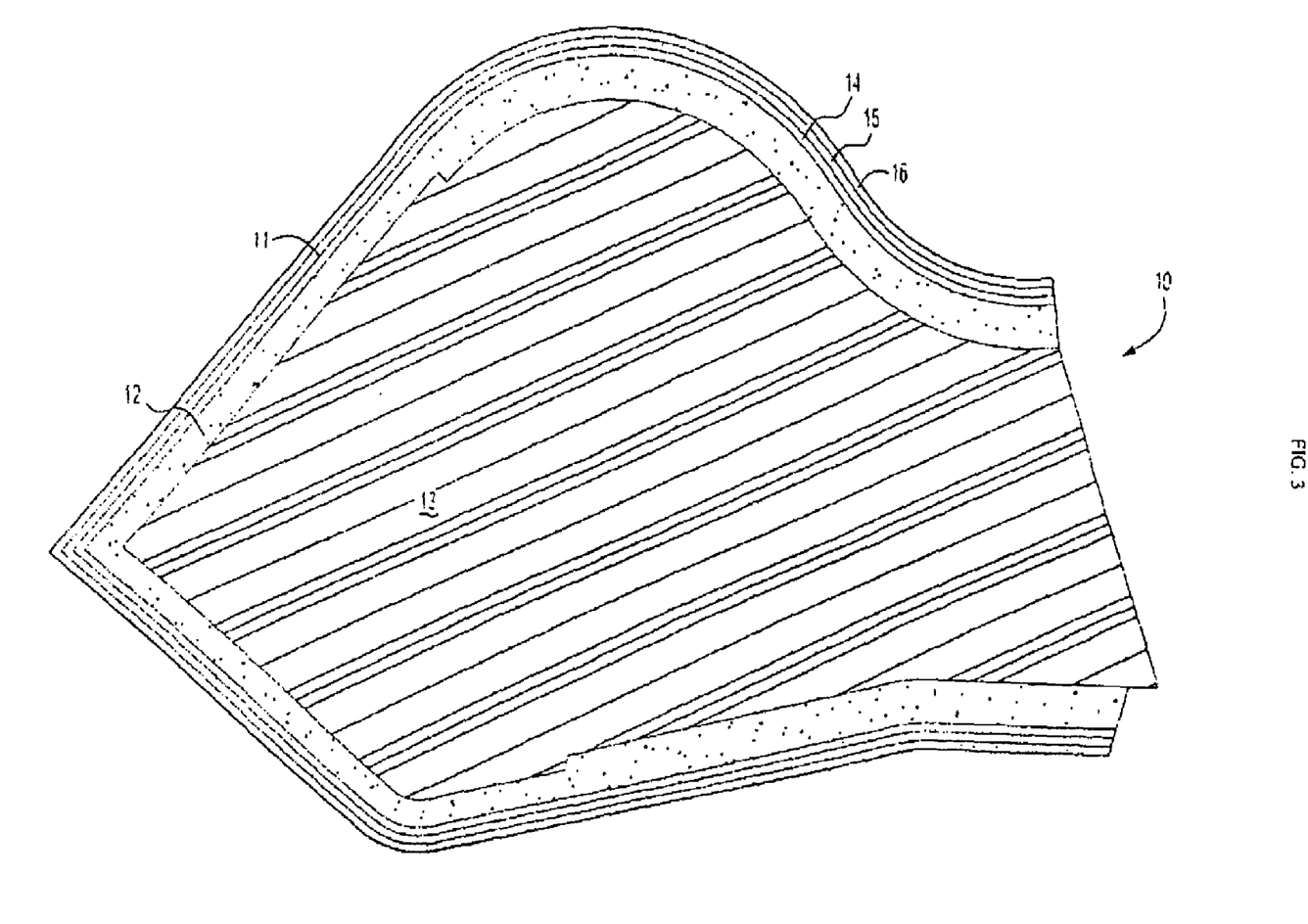
FIG. 3 shows a cross-sectional view of a structural reinforcing member with a three layer film.

FIG. 3 is similar to FIG. 1. except a three-layer film (11) is used. The figure illustrates a cross-sectional view of a structural reinforcing member (10). The structural reinforcing member (10) has a film (11) adhered to an expandable material layer (12) coated onto a rigid foam structure (13). The film (11) comprises three layers, a leave-on layer (14) adjacent to the expandable material layer (12); an adhesion layer (15) located between the leave-on film layer and a carrier film layer (16) wherein the carrier film layer (16) is located as the outside film layer.

The process of the invention can be described in the context of FIG. 2. The apparatus or mold (20) is opened and film (27) is placed in each mold half (21 and 22). A part (26) is placed in the cavity (23) of one of the mold halves (22). The other mold half (21) is closed so that the two mold halves (21 and 22) surround the part (26) with film (27) surrounding the part (26) and located between the part (26) and the mold halves (21 and 22). There is a gap (28) between the part (26) and the mold halves (21 and 22) layered with the film (27). The film (27) is sealed by 0 rings (28) about the injection nozzle (24). The mold is heated to the desired temperature (about 90° C. to about 150° C.). Expandable material is injected into the gap (29) between the part (26) and film (27) through the tube (25) of the injection nozzle (24), until the entire gap (29) is filled. If the expandable material needs to about the part (26), the part (26) with the injected epoxy is maintained in the mold cavity (23) until the expandable material gels. Thereafter the mold half (21) is opened to open the mold cavity (23). The part (26) with expandable material coated thereon and film (27) adhered to the expandable material is removed from the mold, and it is coated. The apparatus (20) is now ready to repeat the process.

SPECIFIC EMBODIMENTS

The following examples are included to illustrate the invention and are not meant to limit the scope of the claims. Unless otherwise stated all parts and percentages are by weight.

To automate the process and allow for multiple molds to feed from one gun, a sheet separator is needed. This is a reusable or disposable piece that keeps the sheets separated for the gun to enter but allows the mold to be closed without the gun in place. A temporary plug may be used after the gun is removed to prevent black flow of the expandable coating from leaving the mold. The gun can now be transferred to the next mold which is already closed and ready to be filled.

BETAMATE™73607 adhesive comprises a mixture of 30 to 40 percent by weight of a Bisphenol A based liquid epoxy resin having an epoxy equivalent weight of about 181, 15 to 25 percent by weight of a blend of a high viscosity advanced liquid epoxy resin based on Bisphenol A having an epoxy equivalent weight of 230 to 250 and a solid advanced epoxy resin based on Bisphenol A having an epoxy equivalent weight of about 675 to 750; polymethyl methacrylate as a gelling agent, dicydicyanamide as a curing agent and a mixture of phenyldimethyl urea and a modified benzamide (MMB 2191 available from Celerity LLC as catalysts and as a blowing agent azodicarbonamide.

XUS 66185 film comprises three layer a 0.8 mil (0.02032 mm) layer of ethylene acrylic acid available from The Dow Chemical Company, a film of the trademark PRIMACOR™3330, an intermediate layer of 0.3 mils (0.00762 mm) of a homopolymer polypropylene and 2.5 mil (0.0635 mm) layer of a copolymer of polypropylene blended with a minor amount of polyethylene available from The Dow Chemical Company under the designation DC783.00, XV661.

EXAMPLE 1

175 grams of BETAMATE™ 73607 adhesive was applied to a less than 1 mil (0.0254 mm) LDPE (low density polyethylene) film. A second sheet was placed on top of the opposite side of the epoxy forming a sandwich configuration, film/epoxy/film. 2 mm spacers were placed around the perimeter of the epoxy in a 25 cm square shape between the two pieces of film to set the epoxy thickness. The sandwich film/epoxy/film was placed into a heated press preset to 110° C. The press was then closed squeezing the epoxy to a thickness of 2-mm. After 5 minutes the press was then opened and the sheet was easily removed from the metal press. The sheet was cooled to room temperature and the film was then easily removed.

EXAMPLE 2

175 grams of BETAMATE™ 73607 adhesive was sandwiched between two sheets of a LDPE film, 3.5 mil (0.0889 mm) with a corona treatment on one surface of the film. On one side of the epoxy mass the film with the treatment was placed towards the epoxy and on the opposite side of the epoxy mass the treatment was placed away from the epoxy. The film/epoxy/film sandwich configuration was heated for 5 minutes in the heated metal press to form a 2-mm casting. A 10-cm×10-cm square was cut out of the 25-cm square casting and placed between hot dip galvanized (HDG) panels with a 2-mm air gap, using spacers to form the air gap. The HDG panel/film/epoxy/film/HDG panel sandwich configuration was than baked for 45 minutes @ 170° C. Each HDG panel was pulled away from the epoxy, the side with the treatment towards the epoxy came off the HDG panel easily, very little to no adhesion was observed between the non treated side of the film and the HDG panel. The treated side of the film bonded to the epoxy and could not be removed. The side with the treatment towards the HDG panel was very difficult to remove from the HDG panel, 100 percent cohesive failure was observed.

EXAMPLE 3

A Teflon sheet with an adhesive backing was adhered to a HDG panel. Two of these Teflon/HDG panels were prepared. Then one coat of water based epoxy, EPI-REZ* 3540-WY-55, was brushed onto the Teflon sheets and the water was allowed to flash off. The BETAMATE™ 73607 epoxy adhesive was then applied between the two epoxy-coated panels. Two mm spacers were placed around the perimeter of the epoxy. This sandwich configuration was then placed into the heated press at 110° C. for 2 minutes, pre-gelling the epoxy into a 2 mm casting. The sandwich configuration was cooled to 55° C. The sandwich configuration was pulled apart and the water-based epoxy and the expandable epoxy were easily pulled away from the HDG panel. The water based epoxy film was bonded to the expandable epoxy surface with a tack free surface.

This pre-gelled epoxy dried with the water based epoxy coating was placed between two HDG panel with 4 mm spacers (i.e. 2 mm air gap) and baked at 170° C. for 45 minutes. 100 percent cohesive failure was observed between the epoxy and the steel panel. The water-based epoxy film did not interfere with the adhesion.

EXAMPLE 4

A 16" (40.64 cm) square-piece of XUS 66185 3 layer film was placed on the bottom half of the heated tool 250° F. (121° C.) with the carrier layer adjacent to the heated mold, the foam article was placed on top of the leave-on layer of the film and a second piece of the XUS 66185 film was placed on top of the foam part with the carrier layer adjacent to the heated top half of the mold. The mold was then closed leaving a 2 to 3 mm gap between the film and the tool. A 132 gram mass of BETAMATE™ 73607 expandable adhesive was dispensed and injected into the open area between the foam and the leave-on layer of the film.

The tool was opened after 90 seconds; the foam/epoxy/film part was removed. The multi layer film was adhered to the expandable epoxy. After the part reached ambient temperature the carrier and B intermediate layer of the film were easily removed from the part as one layer.

What is claimed is:

1. A process for the preparation of an article comprising
   a) placing a film on the inner surface of each part of a two part mold;
   b) placing an article in the mold with film located between the surface of the mold and the article;
   c) closing the mold about the article such that there is a small space between the article and the surface of the mold;
   d) injecting between the film and the article an expandable material under conditions that the article is coated with the expandable material and the expandable material does not expand;
   e) removing the article with the expandable material coated thereon with the film attached to the expandable material wherein the film is removed from the exuandable material coated plastic article.

2. The process of claim 1 wherein rho expandable material exhibits adhesive properties under conditions at which the expandable material is expanded.

3. The process of claim 1 wherein the article is a shaped foam article.

4. The process of claim 1 wherein the article is a structural reinforcement member adapted to reinforce a cavity in a structure.

5. A process for the preparation of an article comprising
   a) placing a film on the inner surface of each part oC a two part mold;
   b) placing an article in the mold with film located between the surface of the mold and the article:
   c) closing the mold about the article such that there is a small space between the article and the surface of the mold;
   d) injecting between the film and the article an expandable material under conditions that the article Is coated with the expandable material and the expandable material does not expand, wherein the expandable material is comprised of a heat activated blowing agent;
   e) removing die article with the expandable material coated thereon with the film attached in the expandable material.

6. The process of claim 5, wherein the heat activated blowing agent is activated at a temperature of about 100° C. or greater.

7. The process of claim 6, wherein the temperature is about 120° C. or greater.

8. The process of claim 7, wherein the temperature is not greater than about 200° C.

9. The process of claim 5, wherein the expandable material is a polymeric material.

10. The process of claim 9, wherein the polymeric material is polyvinyl chloride, methacrylate, phenoxy thermoplastics or combination thereof.

11. The process of claim 9, wherein the expandable material is an expandable adhesive.

12. The process of claim 11, wherein the expandable adhesive is comprised of an epoxy resin.

13. The process of claim 12, wherein the epoxy resin a one part epoxy resin.

14. process of claim 12, wherein the expandable adhesive has a viscosity increasing agent.

15. process of claim 12, wherein the expandable adhesive has a curing agent.

16. The process of claim 9, wherein expandable material is a polyolefin, copolymers and terpolymers with at least one monomer type an alpha-olefin, phenollfonnaldehyde material, phenoxy material, or polyurethane material.

* * * * *